United States Patent Office 3,442,887
Patented May 6, 1969

3,442,887
NAPHTHOL-AZO-PHENYL MONOAZO DYESTUFFS
Karl Hermann, Remy, Warwick, R.I., assignor to American Hoechst Corporation, New York, N.Y.
No Drawing. Filed Aug. 18, 1966, Ser. No. 573,217
Int. Cl. C09b 29/16, 29/30; C07c 107/30
U.S. Cl. 260—201  9 Claims The present invention relates to new monoazo dyestuffs which correspond to the formula

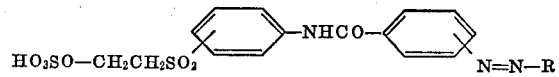

wherein R stands for

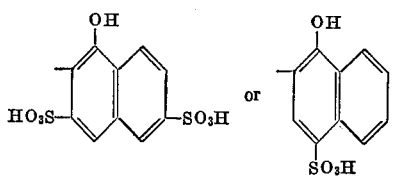

and the azo- and the —O$_2$CH$_2$CH$_2$OSO$_3$H groups are in meta or para position to the —NH—CO— group.

The most closely similar dyestuffs heretofore believed to have been disclosed are the red monoazo dyestuffs of U.S. Patent 3,008,950 corresponding to the formula

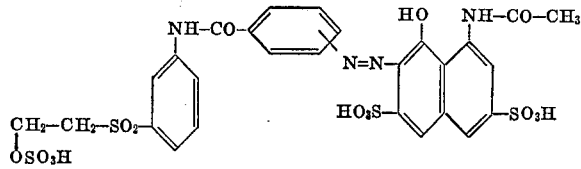

wherein the azo-group is meta or para to the NH—CR-group.

It has been found that valuable watersoluble monoazo dyestuffs yielding orange to scarlet tints with good fastness properties to wet processing and to light can be obtained by diazotizing an amine of the formula

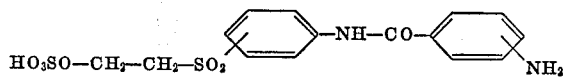

wherein the amino and —SO$_2$CH$_2$CH$_2$OSO$_3$H substituents are meta or para to the NH—CO—group, and coupling the diazo compound with 1 - hydroxy-naphthalene-3,6-disulfonic acid or 1-hydroxy-naphthalene-4-sulfonic acid.

While the shade of the respective dyestuffs is affected very much by the use of the different azo-components, i.e., from orange with 1-hydroxy-naphthalene-3,6-disulfonic acid to scarlet with 1-hydroxy-naphthalene-4-sulfonic acid, it is also shifted to some extent to the more yellow side if the amino group is meta rather than para to the —NHCO—group. A change in the position of the esterified beta-hydroxy-ethyl-sulfone-group from meta to para, however, has practically no influence at all. The dyeings produced with the new dyestuffs are distinguished primarily by high tinctorial strength, an especially good build-up and high brilliancy.

The dyestuffs of the invention are especially suitable for dyeing and printing cellulosic materials, such as linen, regenerated cellulose and particularly cotton. They are applied to the cellulose fiber by treating the material with an aqueous solution of the dyestuffs in the presence of an acid binding agent, such as sodium hydroxide, sodium carbonate, sodium bicarbonate or trisodium phosphate, or with a printing paste with the addition of an acid binding agent. The treatment with the acid binding agent may be carried out before, during or after the application of the dyestuff.

The following examples serve to illustrate the invention but they are not intended to limit it thereto. The parts are by weight unless otherwise stated, and the relationship of parts by weight to parts by volume is the same as that of the kilogram to the liter. Temperatures are given on the centigrade scale.

Example 1

64 parts of 3 - (4'-amino-benzoylamino)-benzene-(1)-beta-hydroxy-ethylsulfone (melting point 150–152° C.) are added to 400 parts of pyridine. After heating to 80°, 60 parts of sulfamic acid are added. The temperature rises by itself and is maintained at 100–105° C. for one-half hour. Then about 300 parts of pyridine are distilled off under reduced pressure. After adding 30 parts of water, a pyridine-water mixture is distilled off under reduced pressure. This procedure is repeated three times in order to remove additional pyridine. Then the obtained sulfuric ester is dissolved in 700 parts of water. The pH of the solution is about 6.5.

To prepare the diazo compound, 50 parts of a 34.8% aqueous solution of sodium nitrate are added at a pH of 6.8–7.0 and at 35–40°, then this solution is run into a mixture of 560 parts of water, 240 parts of ice and 105 parts of 31.8% hydrochloric acid at a temperature of below 0°, which takes about 1000 more parts of ice. The diazo compound precipitates in fine yellow crystals.

This diazo compound is coupled by adding to it a solution of 62.6 parts of 1-hydroxy-naphthalene-3,6-disulfonic acid in 400 parts of water, said solution having a pH of about 7.0. After all of the disulfonic acid compound has been added, the coupling is completed by raising the pH to 6.4–6.7 and maintaining it at that level for several hours.

The dyestuff is then precipitated by addition of potassium chloride, filtered off with suction and dried at 60–65° in a vacuum dried. It has the formula:

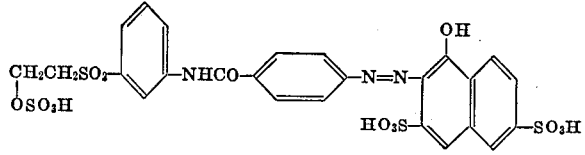

185 parts of a red powder are obtained which dissolves easily in water. From salt-containing dyeing baths in the presence of alkaline compounds, it dyes fibers of native and regenerated cellulose very brilliant orange shades of good fastness to wet processing and to light. The build-up of the dyeings is particularly good.

Example 2

If 64 parts of 4-(4'-amino-benzoylamino)-benzene-(1)-beta-hydroxyethylsulfone (melting point 255–258°) are used instead of 64 parts of 3-(4'-amino-benzoylamino)-benzene-(1)-beta-hydroxyethylsulfone in the procedure of Example 1, 183 parts of a red powder are obtained which likewise gives brilliant orange shades of good fastness properties on cellulose fibers. It has the formula:

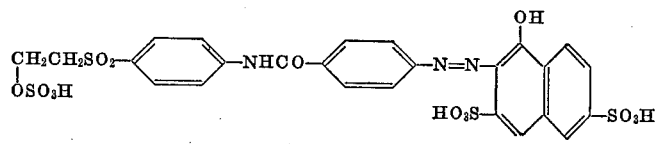

Example 3

If 46.0 parts of 1-hydroxy-naphthalene-4-sulfonic acid are used instead of 62.6 parts of 1-hydroxy-naphthalene-3,6-disulfonic acid in the procedure of Example 1, 174 parts of a red powder are obtained. This yields very brilliant scarlet dyeings of good fastness to wet processing and to light on cellulose fibers. The shade of this dyestuff which has the formula:

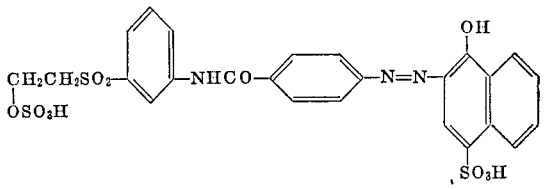

is distinctly redder than that of Example 1.

Example 4

If 64 parts of 4-(4'-amino-benzoylamino)-benzene-(1)-beta-hydroxyethylsulfone (melting point 255–258°) are used instead of 64 parts of 3-(4'-amino-benzoylamino)-benzene-(1)-beta-hydroxyethylsulfone, and 46 parts of 1-hydroxy-naphthalene-4-sulfonic acid are used instead of 62.6 parts of 1-hydroxy-naphthalene-3,6-disulfonic acid in the procedure of Example 1, 176 parts of a red powder are obtained. This gives very brilliant scarlet dyeings of good fastness properties against wet processing on cellulose fibers similar to those of Example 3 and has the formula:

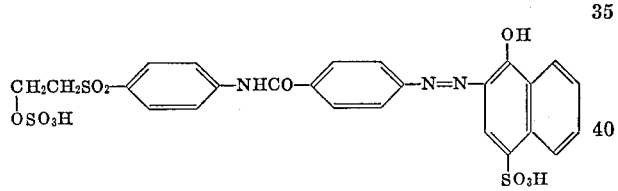

Example 5

If 64 parts of 3-(3'-amino-benzoylamino)-benzene-(1)-beta-hydroxyethylsulfone (melting point 146°–148°) are used instead of 64 parts of 3-(4'-amino-benzoylamino)-benzene-(1)-beta-hydroxyethylsulfone, and 46 parts of 1-hydroxy-naphthalene-4-sulfonic acid are used instead of 62.6 parts of 1-hydroxy-naphthalene-3,6-disulfonic acid in the procedure of Example 1, 130 parts of a red powder are obtained. This gives brilliant orange shades of good fastness properties against wet processing on cellulose fibers and has the formula:

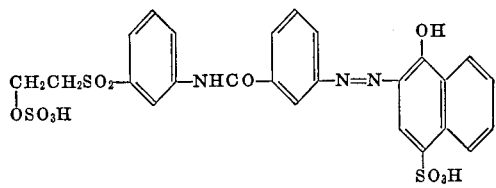

The shade obtained is much less red than those of Examples 3 and 4.

Example 6

If 64 parts of 4-(3'-amino-benzoylamino)-benzene-(1)-beta-hydroxyethylsulfone (melting point 172°–175°) are used instead of 64 parts of 3-(4'-amino-benzoylamino)-benzene-(1)-beta-hydroxyethylsulfone, and 46 parts of 1-hydroxy-naphthalene-4-sulfonic acid are used instead of 62.6 parts of 1-hydroxy-naphthalene-3,6-disulfonic acid in the procedure of Example 1, then 132 parts of a red powder having the formula:

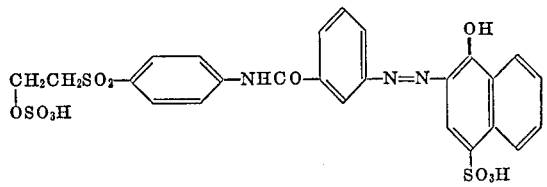

are obtained. This yields, on cellulose fibers, a slightly redder shade than that of Example 5.

Example 7

If 64 parts of 3-(3'-amino-benzoylamino)-benzene-(1)-beta-hydroxyethylsulfone (melting point 146–148°) are used instead of 64 parts of 3-(4'-amino-benzoylamino)-benzene-(1)-beta-hydroxyethylsulfone in the procedure of Example 1, 140 parts of a red powder having the formula:

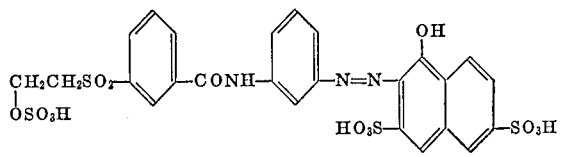

are obtained. This gives much more yellowish orange shades of good fastness properties against wet processing on cellulose fibers than that of Example 1.

Example 8

If 64 parts of 4-(3'-amino-benzoylamino)-benzene-(1)-beta-hydroxyethylsulfone (melting point 172–175°) are used instead of 64 parts of 3-(4'-amino-benzoylamino)-benzene-(1)-beta-hydroxyethylsulfone in the procedure of Example 1, 132 parts of a red powder having the formula:

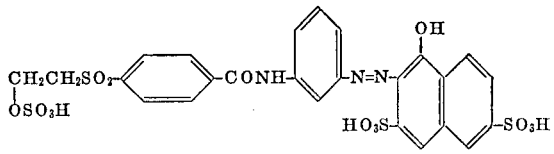

are obtained. This gives, on cellulose fibers, a slightly reder shade than that of Example 7.

We claim:
1. Monoazo dyestuff which corresponds to the formula

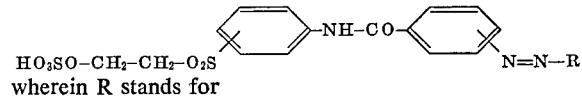

wherein R stands for

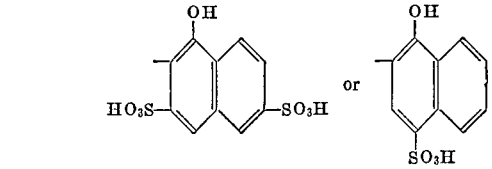

and the azo- and the —SO$_2$—CH$_2$—CH$_2$—OSO$_3$H groups are meta or para to the —NH—CO— group.

2. Monoazo dyestuff which corresponds to the formula

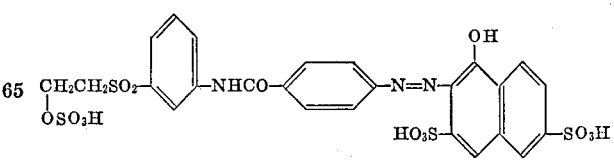

3. Monoazo dyestuff which corresponds to the formula

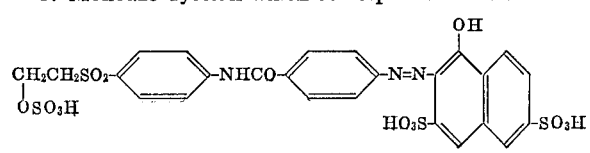

4. The monoazo dyestuff which corresponds to the following formula

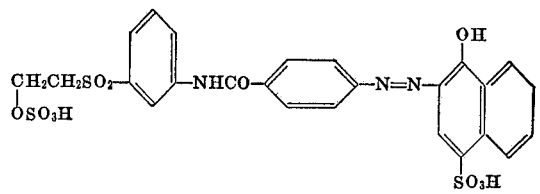

5. The monoazo dyestuff which corresponds to the following formula

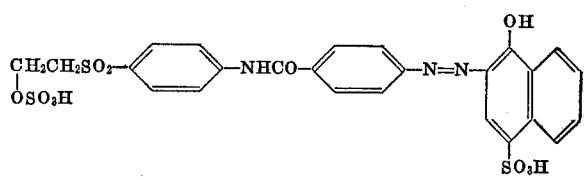

6. The monoazo dyestuff which corresponds to the following formula

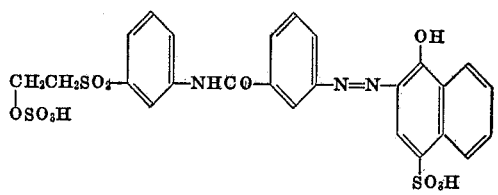

7. The monoazo dyestuff which corresponds to the following formula

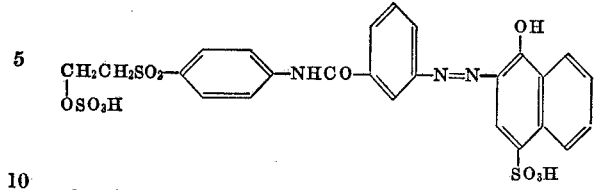

8. The monoazo dyestuff which corresponds to the following formula

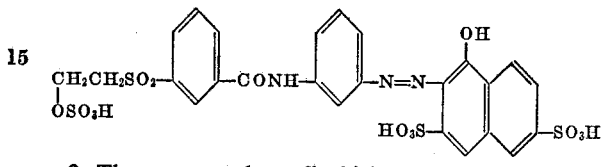

9. The monoazo dyestuff which corresponds to the following formula

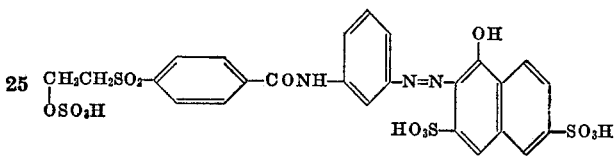

References Cited
UNITED STATES PATENTS
3,008,950  11/1961  Heyna et al. _____ 260—199

CHARLES B. PARKER, *Primary Examiner.*
DONALD M. PAPUGA, *Assistant Examiner.*

U.S. Cl. X.R.
8—41, 51, 54.2; 260—457